Dec. 1, 1942.       G. A. LYON       2,303,854
CLOSURE RETAINING SPRING
Original Filed July 29, 1937    2 Sheets-Sheet 1
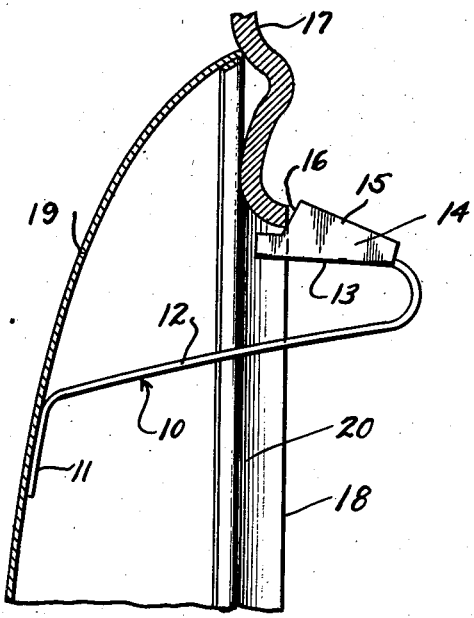
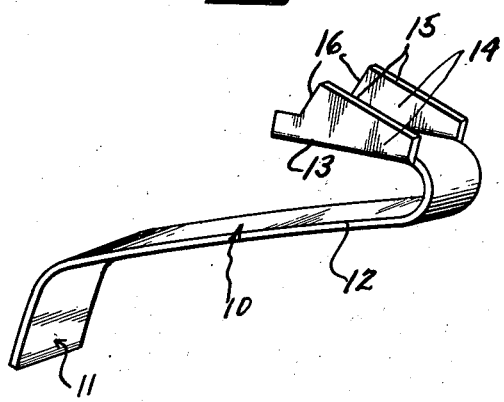
Inventor
GEORGE ALBERT LYON.
by Charles W. Hills
Attys.

Dec. 1, 1942.                 G. A. LYON                 2,303,854
                       CLOSURE RETAINING SPRING
              Original Filed July 29, 1937    2 Sheets-Sheet 2
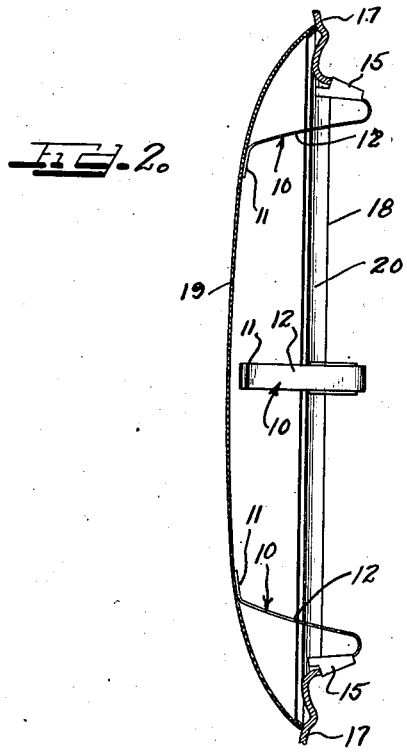
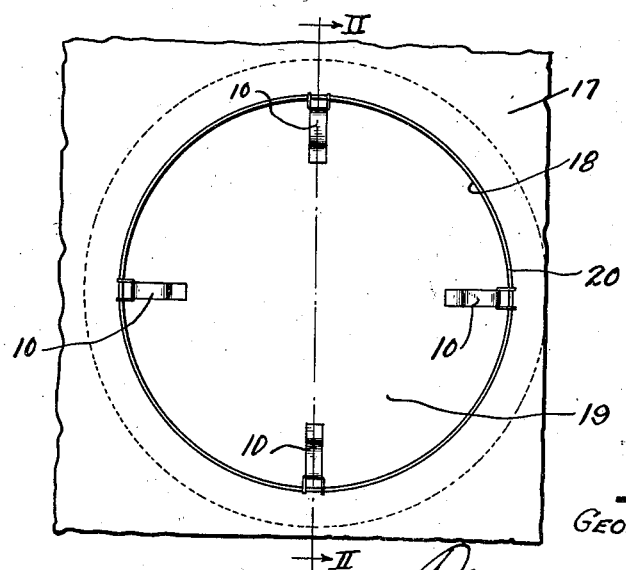
Inventor
GEORGE ALBERT LYON.

Patented Dec. 1, 1942

2,303,854

UNITED STATES PATENT OFFICE 2,303,854

CLOSURE RETAINING SPRING

George Albert Lyon, Allenhurst, N. J.

Original application July 29, 1937, Serial No. 156,279. Divided and this application October 25, 1937, Serial No. 170,782

2 Claims. (Cl. 292—76)

This invention relates to a closure member fastening means, and more particularly to a closure retaining spring for detachably securing a closure member to another member having an aperture therein to be closed which permits the closure member to be mounted with very little effort but which requires a relatively great force to disengage it from the other member.

The subject matter of my present invention has been divided from my copending application Serial No. 156,279, filed July 29, 1937.

In designing elements and mechanisms for detachably retaining a closure member on another member over an opening or a recess in the latter, it has been found that under many circumstances it is desirable to provide a closure retaining means which effects an engagement between the two members with very little effort and through the application of a relatively slight force, but which requires considerable effort and a relatively great force to disengage the member. The reason for desiring a closure retaining means capable of carrying out its securing function in the above manner is that where a closure member is only designed to be removed from another member at infrequent intervals and where the members are subjected to vibration, stresses and strains, or sudden shock, it is desirable that a fastening or securing means be provided which cannot become accidentally losened or disengaged but which can when necessary be disengaged to effect removal of the closure member.

It is an object of this invention to provide a novel attaching means for detachably securing a closure member to another member and which possesses the above highly desirable characteristics.

Another object of this invention is to provide a novel closure member retaining means for detachably securing a closure member to another member, which is economical to manufacture and which is rugged and reliable in use.

A further object of this invention is to provide a novel method and means of securing a closure member to another member which requires only a relatively small force to secure the closure members to the other member but which requires a relatively great force to remove the closure member from the other member.

Another and further object of this invention is to provide a novel form of easy-on hard-off attaching means for detachably securing one member to another member.

Another and still further object of this invention is to provide a novel closure retaining spring which is shaped and formed to detachably secure one member to another member and which is arranged to detachably secure two members together in an easy-on hard-off manner.

The novel features which I believe to be characteristic of my invention are set forth with particularity in the appended claims. My invention itself, however, both as to its organization and maner of construction, together with further objects and advantages thereof, may best be understood by reference to the following description taken in connection with the accompanying drawings, in which:

Figure 1 is a perspective view of a closure retaining spring constructed in accordance with the teachings of the present invention;

Figure 2 is a side elevational view partly in cross section of a closure member mounted on another member by means of the spring elements of Figure 1;

Figure 3 is a rear elevational view of the assembly of Figure 2; and

Figure 4 is an enlarged fragmentary view of the upper part of the assembly shown in Figure 2.

In Figure 1 of the drawings, one embodiment of my invention is illustrated which comprises a spring clip element 10 having a base portion 11, a relatively long laterally extending flexible intermediate leg portion 12, and a reverse bent portion 13. The closure retaining spring or element 10 is preferably formed from a piece of resilient spring steel leaf stock, although it may be formed from a wide variety of other materials having resilient or flexible properties.

The reverse bent portion 13 includes two upwardly extending wings or side portions 14 which are shaped with gradually rearwardly sloping edges 15 and steeply sloping forward edges 16. It has been found that a spring shaped in this particular manner possesses all of the above highly desirable characteristics.

In Figures 2, 3, and 4 of the drawings I have illustrated one manner in which the closure retaining element of Figure 1 may be employed to retain a closure member on another member. More specifically, member 17 is shown having an opening 18 therein which is arranged to be covered or closed by a closure member 19. The exact shape and configuration of the member 17 and the closure member 19 is not of the essence of the present invention and hence may vary through wide limits without departing from the spirit and scope of the present invention.

To detachably secure the closure member 19 to the member 17 by an easy-on hard-off detachable engagement, a plurality of spring elements 10 of the type shown in Figure 1 are provided. The base portions 11 of the spring element 10 are welded or otherwise suitably secured to the rear surface of the closure member 19. The intermediate leg portions 12 project rearwardly from the underside of the closure member 19 and are of sufficient length when the closure member 19 is in its desired mounted position that the rear ends of leg portions 12 extend through the opening 18 of member 17. As will readily be understood by an inspection of the various figures of the drawings, the closure member 19 is held in position over the opening 18 of member 17 by virtue of the engagement of the steep forward portions 16 of the wings 14 of the spring element 10.

The manner in which the spring element 10 effects an easy-on hard-off detachable engagement with the member 17 will now be described. As will be understood best by referring to Figure 2, the spring elements 10 are cammed under the opening defining edge 20 of the member 17 as the closure member 19 is moved from left to right as viewed in Figure 2. This is by reason of the fact that the gradually sloping rear edges 15 freely ride under the opening defining edge 20 due to the flexing of the spring element 10 throughout its free body portion. As the highest points of the edges 15 pass beyond the rear edge of the opening defining edge 20, the spring element snaps radially outwardly causing the steep forward edges 16 of the spring elements 10 to engage the edge of the opening 18. Due to the fact that the rearwardly extending leg portions 12 of the spring elements 10 are relatively long, it will readily be understood that the spring elements 10 are very easily flexed in the manner above described.

In order to remove the closure member 19 from the member 17, it will be observed that instead of having a gradually sloping edge which will cam the spring element 10 under the opening defining edge 20, relatively steep sloping edges 16 are resisting the removal of the closure member 19. As force is applied to the closure member 19 tending to move it from right to left as viewed in Figure 2, the reversely bent portions 13 of the spring element 10 will tend to increase the angle which they make with the intermediate leg portion 12. The effect of this is to tend to cause a flexing of the spring elements 10 at the junction point of the base portions 11 with the leg portions 12 and also at the junction point of the leg portions 12 and the reversely bent portions 13. The result of this flexing of the spring element 10 appears to be to decrease the steepness of the slope of the forward edges 16. Upon the application of sufficient force from right to left on the closure member 19, the spring elements 10 will snap out of engagement with the opening defining edge of the member 17.

Although the mechanical action of the spring element 10 in disengaging itself from the member 17 is somewhat involved and not readily definable by a single word, I prefer to designate this type of a closure retaining spring as a "lift spring," due to the lifting or spreading tendency of the reversely bent portions 13 thereof as the force is applied to remove the closure member 19 from the member 17.

It has been found in practice that a construction of the above character can be provided in which the closure member 19 can be mounted over the opening 18 and the member 17 by simply pressing on the closure member 19 with the thumb of one hand, but in which the closure member 19 can only be removed by the use of a screwdriver or some other suitable pry-off tool which can be inserted under an edge of the closure member 19 and can be given sufficient leverage to apply considerable force thereto.

Although I have illustrated my novel closure retaining element as being applied on a closure member of circular shape for closing a circular opening, it is to be understood that it can be employed with equal success on closure members of any shape or configuration to cover openings of any shape or configuration without departing from the spirit and scope of the present invention.

From the above description, it will be seen that I have provided an extraordinarily simple, yet effective method and means for detachably securing closure members to other members. The novel securing means includes the highly desirable characteristics of requiring only a slight deformation force to assemble the closure member on the outer member but requiring a relatively great force to disengage the closure member from the other member.

While I have shown a particular embodiment of my invention, it will, of course, be understood that I do not wish to be limited thereto, since many modifications may be made, and I therefore contemplate by the appended claims to cover all such modifications as fall within the true spirit and scope of my invention.

I claim as my invention:

1. As an article of manufacture, a latch spring for holding a closure member in concealing relation to another member, one of which members includes a shoulder adapted to be retainingly engaged by the latch spring, said latch spring comprising a strip of metal having a supporting portion formed for connection to one of the associated members and also having a remotely disposed free end portion projecting laterally therefrom for positioning inside the other member, said supporting portion being connected to the free end portion by two bent intermediate portions, one being remote from the other, and adjacent the extremity of said free end portion so as to be disposed behind and laterally inwardly of the shoulder of the member engaged thereby, said remote bent portion being connected to said extremity of the spring by a shoulder contacting surface constructed and arranged to slide over the shoulder as well as behind the same and into and out of retaining engagement therewith upon flexure of said bent portion, and said bent portions being so arranged as to enable but resist lifting of the remote bent portion to disengage the latch spring but being readily flexible in a direction to spring the latch spring into retaining position.

2. As an article of manufacture, a latch spring comprising a strip of metal including a base and mounting portion, a relatively long leg portion extending laterally from said base portion and at an angle thereto closely approximating a right angle, and a second relatively short leg portion connected by a bend to said first leg portion and including a slide surface for contacting an edge of an object to be spring engaged by pressure in the direction of the length of the spring to force said surface over and behind said edge, said short leg portion being turned back upon said long leg portion so that said slide surface is at a substantial angle to the direction of the retaining pull of the spring whereby said short leg portion when in retaining position will lift to a limited extent upon the application of a force to disengage the spring and thus resist disengagement from latching position until a substantial force is applied sufficient to cause said slide surface of the short leg portion to slide over said edge, said mounting portion being remote from said short leg portion so flexure takes place in said short leg portion, as well as in length of said long leg portion.

GEORGE ALBERT LYON.